(12) United States Patent
Kato

(10) Patent No.: US 11,622,099 B2
(45) Date of Patent: Apr. 4, 2023

(54) INFORMATION-PROCESSING APPARATUS, METHOD OF PROCESSING INFORMATION, AND PROGRAM

(71) Applicant: CANON KABUSHIKI KAISHA, Tokyo (JP)

(72) Inventor: Yuji Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/152,632

(22) Filed: Jan. 19, 2021

(65) Prior Publication Data

US 2021/0144358 A1  May 13, 2021

Related U.S. Application Data

(63) Continuation of application No. PCT/JP2019/026785, filed on Jul. 5, 2019.

(30) Foreign Application Priority Data

Jul. 20, 2018  (JP) .............................. JP2018-136850

(51) Int. Cl.
| | | |
|---|---|---|
| G06T 7/55 | (2017.01) | |
| H04N 13/282 | (2018.01) | |
| G06T 7/73 | (2017.01) | |
| H04N 13/111 | (2018.01) | |
| H04N 5/222 | (2006.01) | |

(52) U.S. Cl.
CPC ............. *H04N 13/282* (2018.05); *G06T 7/74* (2017.01); *H04N 5/2224* (2013.01); *H04N 13/111* (2018.05)

(58) Field of Classification Search
CPC .. H04N 13/282; H04N 5/2224; H04N 13/111; G06T 7/74; G06T 2219/024; G06T 19/003; G06T 2200/24; G06T 15/20; G06F 3/04815
See application file for complete search history.

(56) References Cited

U.S. PATENT DOCUMENTS

| | | | |
|---|---|---|---|
| 10,838,056 B1* | 11/2020 | Cai | G01S 13/50 |
| 10,902,676 B2* | 1/2021 | Bhuruth | H04N 21/21805 |
| 2018/0182114 A1* | 6/2018 | Hanamoto | G06T 3/0012 |
| 2018/0352215 A1* | 12/2018 | Iwakiri | H04N 5/23206 |
| 2019/0158801 A1* | 5/2019 | Matsubayashi | H04N 13/111 |
| 2019/0287302 A1* | 9/2019 | Bhuruth | H04N 21/854 |
| 2019/0335154 A1* | 10/2019 | Tanaka | H04N 1/00114 |
| 2020/0275083 A1* | 8/2020 | Yoneda | H04N 21/4728 |
| 2020/0275084 A1* | 8/2020 | Aizawa | H04N 5/232 |
| 2021/0005023 A1* | 1/2021 | Yoshimura | H04N 13/296 |

FOREIGN PATENT DOCUMENTS

| | | |
|---|---|---|
| JP | 2003316682 A | 11/2003 |
| JP | 2006005415 A | 1/2006 |
| JP | 2014215828 A | 11/2014 |
| JP | 2017012397 A | 1/2017 |
| JP | 2018046448 A | 3/2018 |
| JP | 2018112997 A | 7/2018 |
| WO | 2018/030206 A1 | 2/2018 |

\* cited by examiner

*Primary Examiner* — Howard D Brown, Jr.
(74) *Attorney, Agent, or Firm* — Canon U.S.A., Inc. IP Division

(57) ABSTRACT

An information-processing apparatus generates camera path information that represents changes with time in the position and posture of a virtual viewpoint and provides another apparatus with the generated camera path information.

14 Claims, 10 Drawing Sheets

FIG. 4

| KEY FRAME NUMBER | MOVING IMAGE ID | CAMERA PATH TIME | MOVING IMAGE TIME | CAMERA PARAMETER | | |
|---|---|---|---|---|---|---|
| | | | | POSITION | POSTURE | ANGLE OF VIEW |
| 0 | 3 | 00:00:00:000 | 00:00:00:016 | (0, 2, 0) | (20, 1, 0) | 60 |
| 1 | 3 | 00:00:00:017 | 00:00:00:033 | (0, 3, 0) | (20, 2, 0) | 59 |
| 2 | 3 | 00:00:00:033 | 00:00:00:049 | (0, 4, 0) | (20, 3, 0) | 58 |
| 3 | 3 | 00:00:00:048 | 00:00:00:065 | (0, 5, 0) | (20, 4, 0) | 57 |

FIG. 5

| KEY FRAME NUMBER | MOVING IMAGE ID | CAMERA PATH TIME | MOVING IMAGE TIME | CAMERA PARAMETER | | |
|---|---|---|---|---|---|---|
| | | | | POSITION | POSTURE | ANGLE OF VIEW |
| 0 | 3 | 00:11:00:000 | 00:00:00:000 | (0, 1, 0) | (20, 0, 0) | 60 |
| 1 | 3 | 00:11:00:016 | 00:00:00:016 | (0, 2, 0) | (20, 1, 0) | 60 |
| 2 | 3 | 00:11:00:033 | 00:00:00:033 | (0, 3, 0) | (20, 2, 0) | 59 |
| 3 | 3 | 00:11:00:049 | 00:00:00:049 | (0, 4, 0) | (20, 3, 0) | 58 |
| 4 | 3 | 00:11:00:065 | 00:00:00:065 | (0, 5, 0) | (20, 4, 0) | 57 |

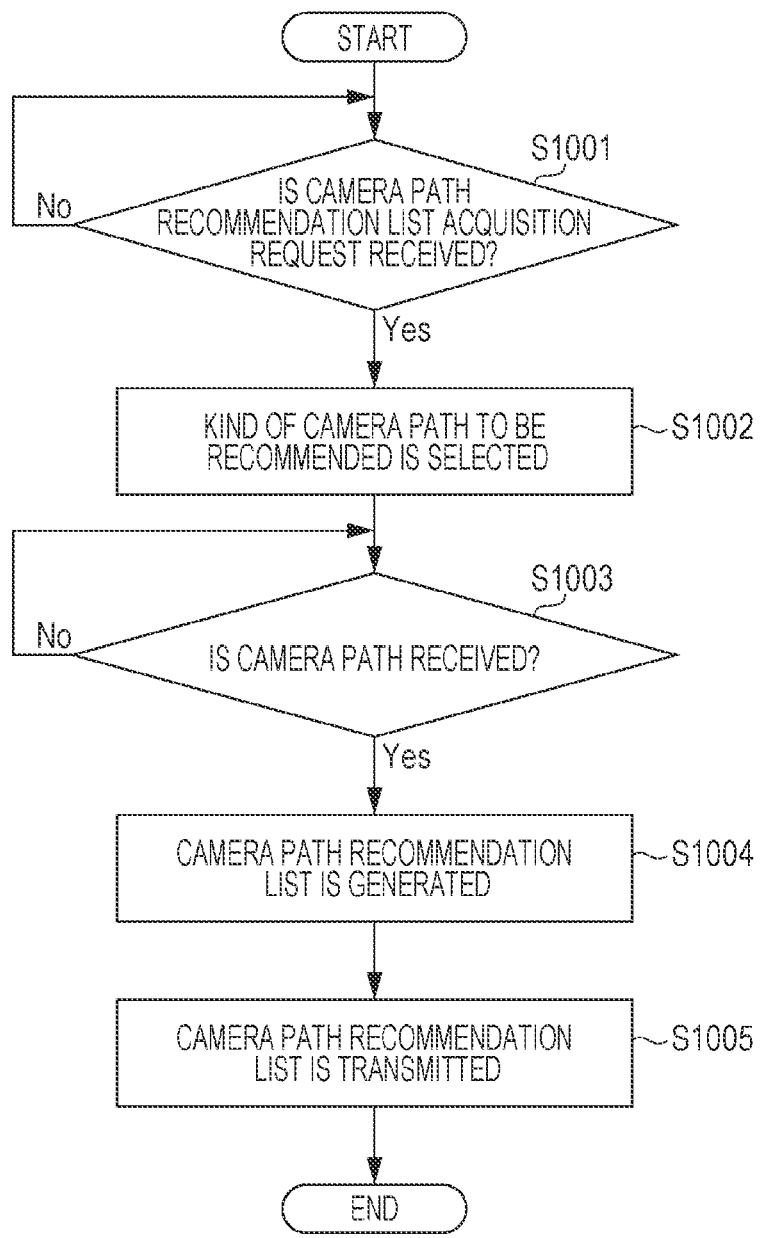

INFORMATION-PROCESSING APPARATUS, METHOD OF PROCESSING INFORMATION, AND PROGRAM

CROSS-REFERENCE TO RELATED APPLICATIONS

This application is a Continuation of International Patent Application No. PCT/JP2019/026785, filed Jul. 5, 2019, which claims the benefit of Japanese Patent Application No. 2018-136850, filed Jul. 20, 2018, both of which are hereby incorporated by reference herein in their entirety.

TECHNICAL FIELD

The present invention relates to a virtual viewpoint image.

BACKGROUND ART

A known technique generates a virtual viewpoint image from images that are captured by using cameras that have different viewpoints. A user can enjoy a single content (for example, a sports game) many times by changing, for example, the position, posture, and angle of view of a virtual camera. In a known method of setting information about the position, posture, and angle of view of the virtual camera or other information when a virtual viewpoint image is generated, the user interactively specifies these by performing a mouse operation or a touch operation.

Japanese Patent Laid-Open No. 2014-215828 discloses that a user adds user information at the position of the virtual camera at a time while a virtual viewpoint image is displayed and makes analysis. Japanese Patent Laid-Open No. 2014-215828 discloses that a popular position of the virtual camera is presented to the user, based on the result of the analysis.

CITATION LIST

Patent Literature

PTL 1: Japanese Patent Laid-Open No. 2014-215828

However, motion of the virtual camera that changes with time cannot be shared by the method in Japanese Patent Laid-Open No. 2014-215828. Accordingly, it is difficult for users to share the motion of the virtual camera that changes with time such as panning, tilting, zooming in, zooming out, or movement of the virtual camera. It is also difficult to share, for example, bullet time motion in which time is stopped and the virtual camera is rotated about an object (for example, a specific sports player) to be watched, and motion in which an object is zoomed in with time. It is also difficult to share camerawork of the virtual camera a temporal operation, for example, to stop or reverse an image.

In view of this, it is an object of the present invention to readily share motion of a virtual camera that changes with time.

SUMMARY OF INVENTION

To solve the problem described above, an information-processing apparatus according to the present invention has, for example, a structure described below. That is, the information-processing apparatus includes a path generation means that generates camera path information that represents changes with time in a position and posture of a virtual viewpoint that represents a viewpoint of a virtual viewpoint image, and a provision means that provides another apparatus with the camera path information that is generated by the path generation means.

Further features of the present invention will become apparent from the following description of exemplary embodiments with reference to the attached drawings.

BRIEF DESCRIPTION OF DRAWINGS

FIG. 4 is a table illustrating an example of camera path information according to the first embodiment.

FIG. 5 is a table illustrating an example of key frame management information according to the first embodiment.

FIG. 10 is a flowchart illustrating the flow of camera path recommendation processing of the data control device 113 according to the second embodiment.

DESCRIPTION OF EMBODIMENTS

Figure 1:
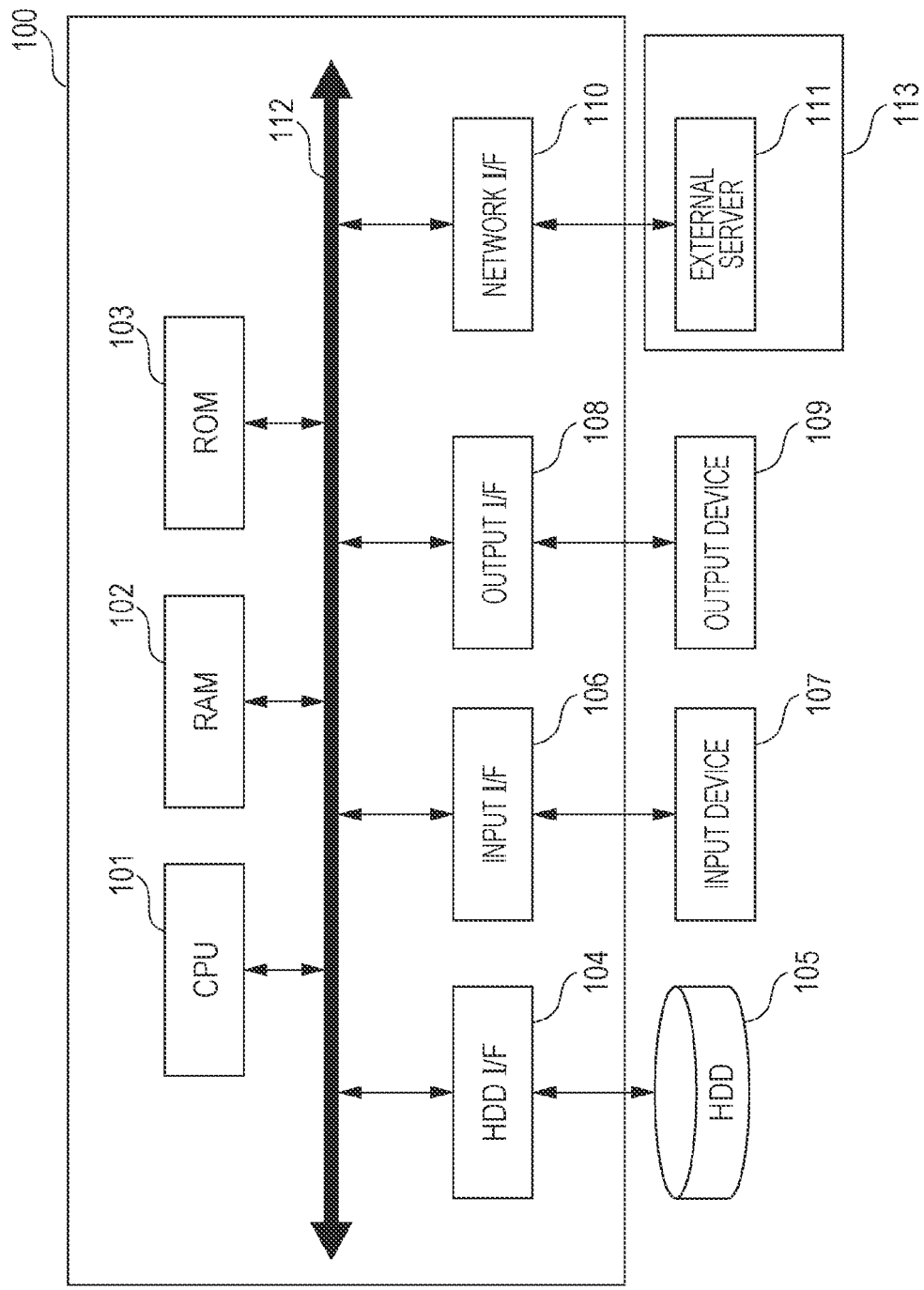
FIG. 1 is a block diagram illustrating the hardware configuration of an information-processing apparatus 100.

Embodiments of the present invention will hereinafter be described with reference to the drawings. The embodiments described below do not limit the present invention. Like components are designated by like reference characters for description.

First Embodiment

In an example described according to a first embodiment, an information-processing apparatus 100 generates, provides, and acquires camera path information about a virtual viewpoint image. In an example described according to the first embodiment, the information-processing apparatus 100 generates the virtual viewpoint image, based on the camera path information that is acquired from another apparatus. The virtual viewpoint image according to the present embodiment is generated based on captured images that are acquired by cameras that capture the images of a field in different directions. The virtual viewpoint image is an image (a video) including one or more images and is generated based on, for example, the position, direction, and angle of view of a virtual viewpoint (a virtual camera). The images that are included in the virtual viewpoint image according to the present embodiment may be compressed by a predetermined moving image compression method, may be compresses by a predetermined still image compression method, or may not be compressed. According to the present embodiment, the camera path information corresponds to information that represents changes with time in the position and posture of the viewpoint (the virtual viewpoint) of the virtual viewpoint image. The camera path information will be described in detail later with reference to FIG. 4.

In an example mainly described according to the present embodiment, the information-processing apparatus 100 has all of functions of generating, providing, and acquiring the camera path information but is not limited thereto. For example, the information-processing apparatus 100 may have only the function of generating the camera path information that represents changes with time in the position and posture of the virtual camera in response to a user operation and the function of providing another apparatus with the camera path information. The information-processing apparatus 100 may have only the function of acquiring the camera path information from another apparatus in response to a user operation, the function of generating the virtual viewpoint image, based on the camera path information, and a display control function of displaying the virtual viewpoint image on a display screen. So-called material data is needed to generate the virtual viewpoint image based on the camera path information by using the information-processing apparatus 100. The material data differs depending on an algorism for generating the virtual viewpoint image, and an example thereof is texture data and three-dimensional shape data of an object. The material data, however, may be information about the captured images that are acquired from the cameras and the arrangement of the cameras. The information-processing apparatus 100 according to the present embodiment acquires the material data from a server via a communication network and saves the material data in a hard disk drive 105 in advance. However, a method of acquiring the material data by using the information-processing apparatus 100 is not limited to a specific method.

An example of the system configuration of the information-processing apparatus 100 according to the present embodiment will be described with reference to FIG. 1. In FIG. 1, a CPU 101 uses a RAM 102 as a work memory and runs programs that are stored in a ROM 103 and/or the hard disk drive (HDD) 105 and controls components described later by using a system bus 112. Consequently, various processes described later are performed. A HDD interface (I/F) 104 is an interface for connecting the information-processing apparatus 100 and a secondary storage device such as the HDD 105 or an optical disk drive to each other, and an example thereof is an interface such as serial ATA (SATA). The CPU 101 can read data from the HDD 105 via the HDD I/F 104 and can write data to the HDD 105. The CPU 101 loads data that is stored in the HDD 105 onto the RAM 102. The CPU 101 can save various kinds of data in the RAM 102 acquired by performing the programs to the HDD 105. An input interface (I/F) 106 is, for example, a serial bus interface such as USE or IEEE1394 for connecting an input device 107 such as a keyboard, a mouse, a digital camera, or a scanner and the information-processing apparatus 100 to each other. The CPU 101 can read data from the input device 107 via the input I/F 106. An output interface (I/F) 108 is, for example, an image output interface such as DVI or HDMI (registered trademark) for connecting an output device 109 such as a display and the information-processing apparatus 100 to each other. The CPU 101 enables the virtual viewpoint image to be displayed by transmitting data related to the virtual viewpoint image to the output device 109 via the output I/F 108. A network interface (I/F) 110 is, for example, a network card such as a LAN card for connecting the information-processing apparatus 100 and an external server 111 to each other. The CPU 101 can read data from the external server 111 via the network I/F 110.

In an example in the above description, the HDD 105, the input device 107, and the output device 109 are devices that differ from the information-processing apparatus 100. However, this form is not a limitation. For example, the information-processing apparatus 100 may be a smartphone. In this case, the input device 107 (a touch screen) and the output device 109 (the display screen) are integrated with the information-processing apparatus 100. A device that contains the HDD 105 may be used as the information-processing apparatus 100. All of the components illustrated in FIG. 1 are not necessarily essential components. For example, in the case where the virtual viewpoint image that is stored in the HDD 105 is played back, the external server 111 is not needed. In the case where the virtual viewpoint image that is acquired from the external server 111 is played back, however, the HDD 105 is not needed. The information-processing apparatus 100 may include the CPUs 101. The information-processing apparatus 100 may include a CPU (Graphics Processing Unit) or one or pieces of exclusive hardware that differ from the CPU 101, and the GPU or the exclusive hardware may perform at least part of processing of the CPU 101. Examples of the exclusive hardware include an ASIC (an application specific integrated circuit), a FPGA (a field-programmable gate array), and a DSP (a digital signal processor).

Figure 2:
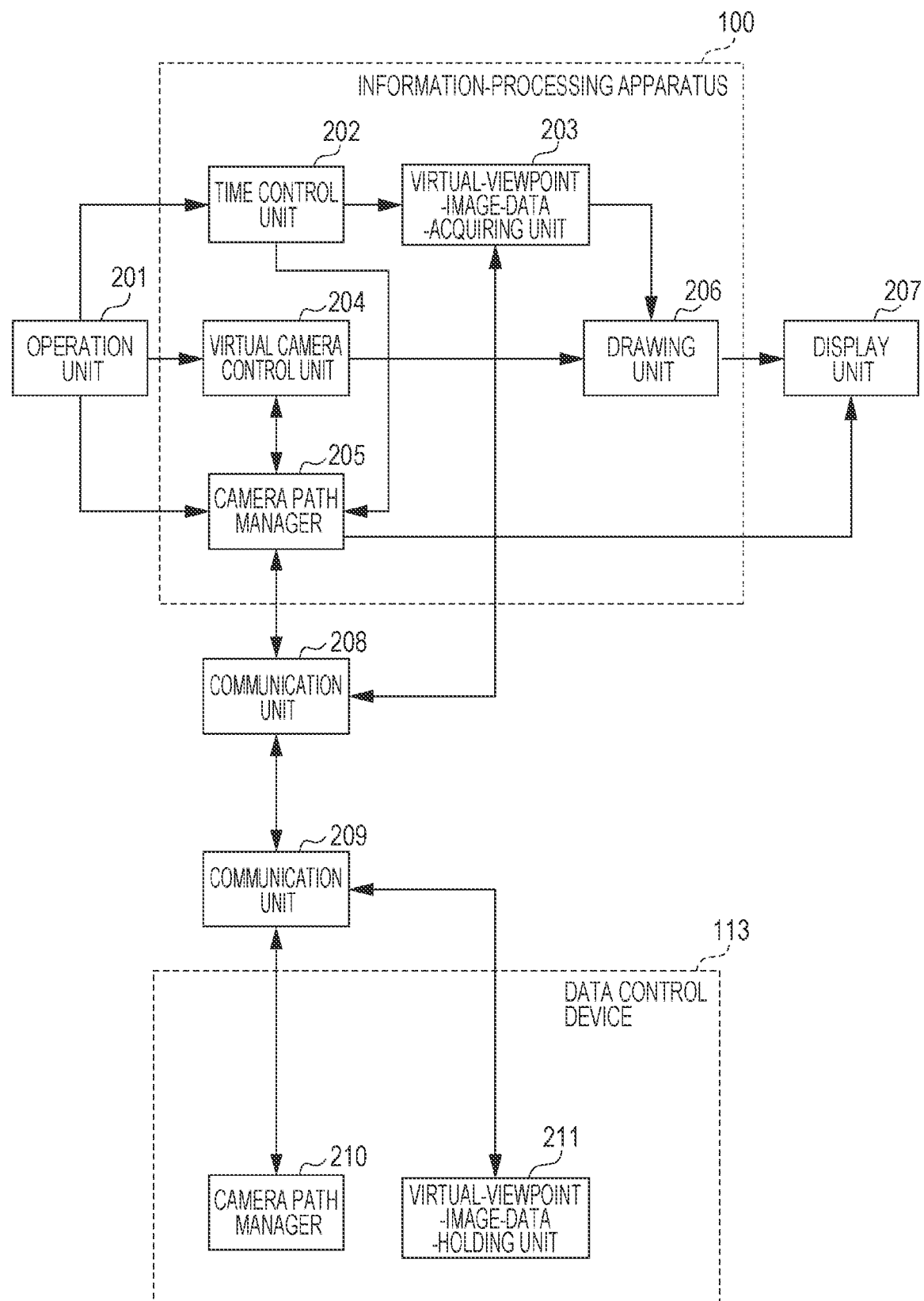
FIG. 2 is a block diagram illustrating the functional configuration of the information-processing apparatus 100 and a data control device 113.

The flow of processing that is performed by the information-processing apparatus 100 according to the present embodiment will now be described with reference to FIG. 2 and FIG. 3. FIG. 2 is a block diagram illustrating the functional configuration of the information-processing apparatus 100 according to the present embodiment. The CPU 101 serves as functional blocks in the information-processing apparatus 100 illustrated in FIG. 2 by reading and running programs that are stored in the ROM 103 and/or the HDD 104 with the RAM 102 used as a work area. An operation unit 201 and a display unit 207 in FIG. 2 correspond to the input device 107 and the output device 109 in FIG. 1. It is not necessary for the CPU 101 to serve as all of the functional blocks in the information-processing apparatus 100, but exclusive processing circuits corresponding to the functional blocks may be provided.

Figure 3:
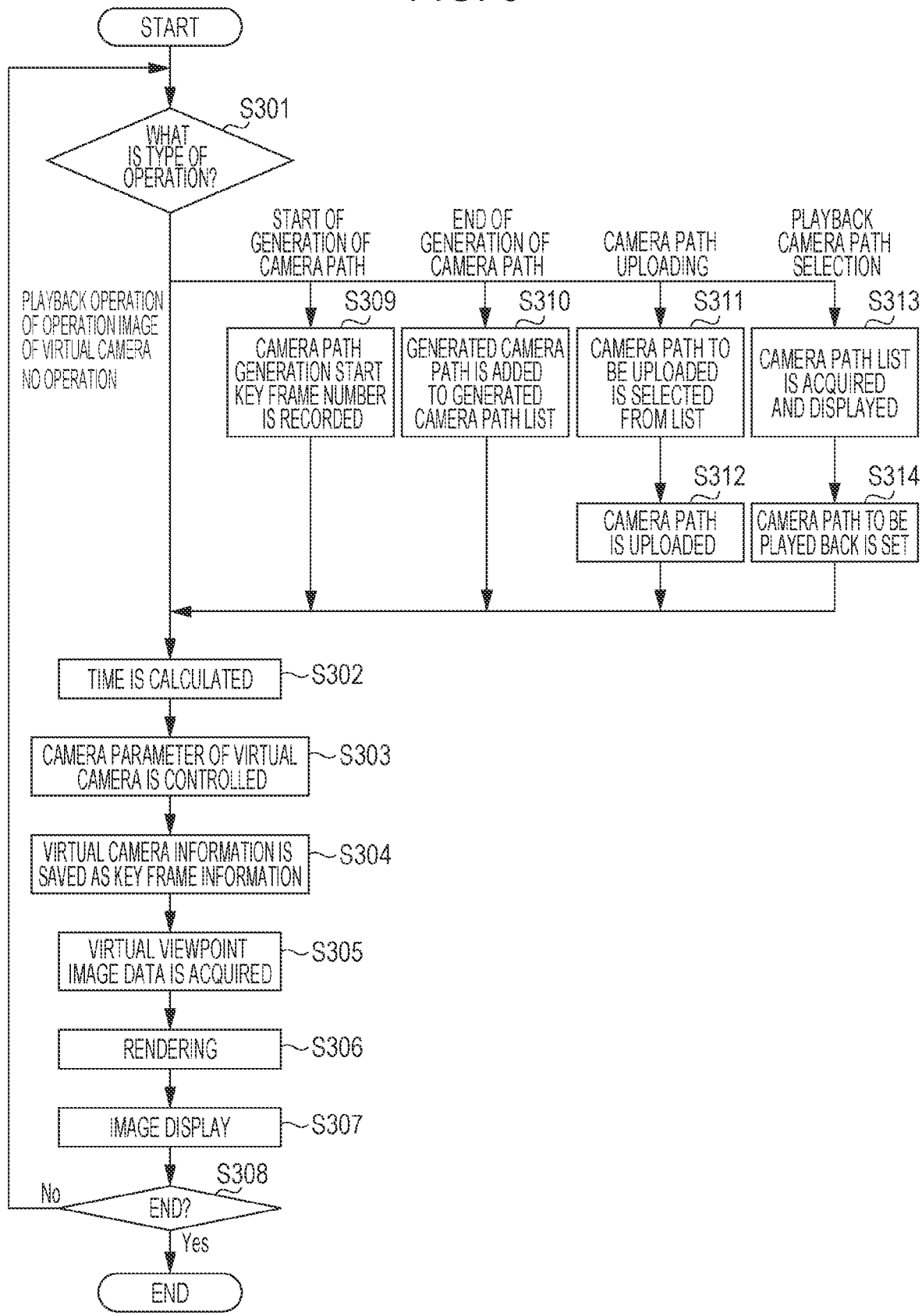
FIG. 3 is a flowchart illustrating the flow of processing of the information-processing apparatus 100 according to a first embodiment.

FIG. 3 is a flowchart illustrating the flow of processing of the information-processing apparatus 100 according to the present embodiment. Processes that will be described with reference to FIG. 3 are performed in a manner in which the CPU 101 of the information-processing apparatus 100 reads and runs programs that are stored in the ROM 103 and/or the HDD104 with the RAM 102 used as the work area.

Figure 6:
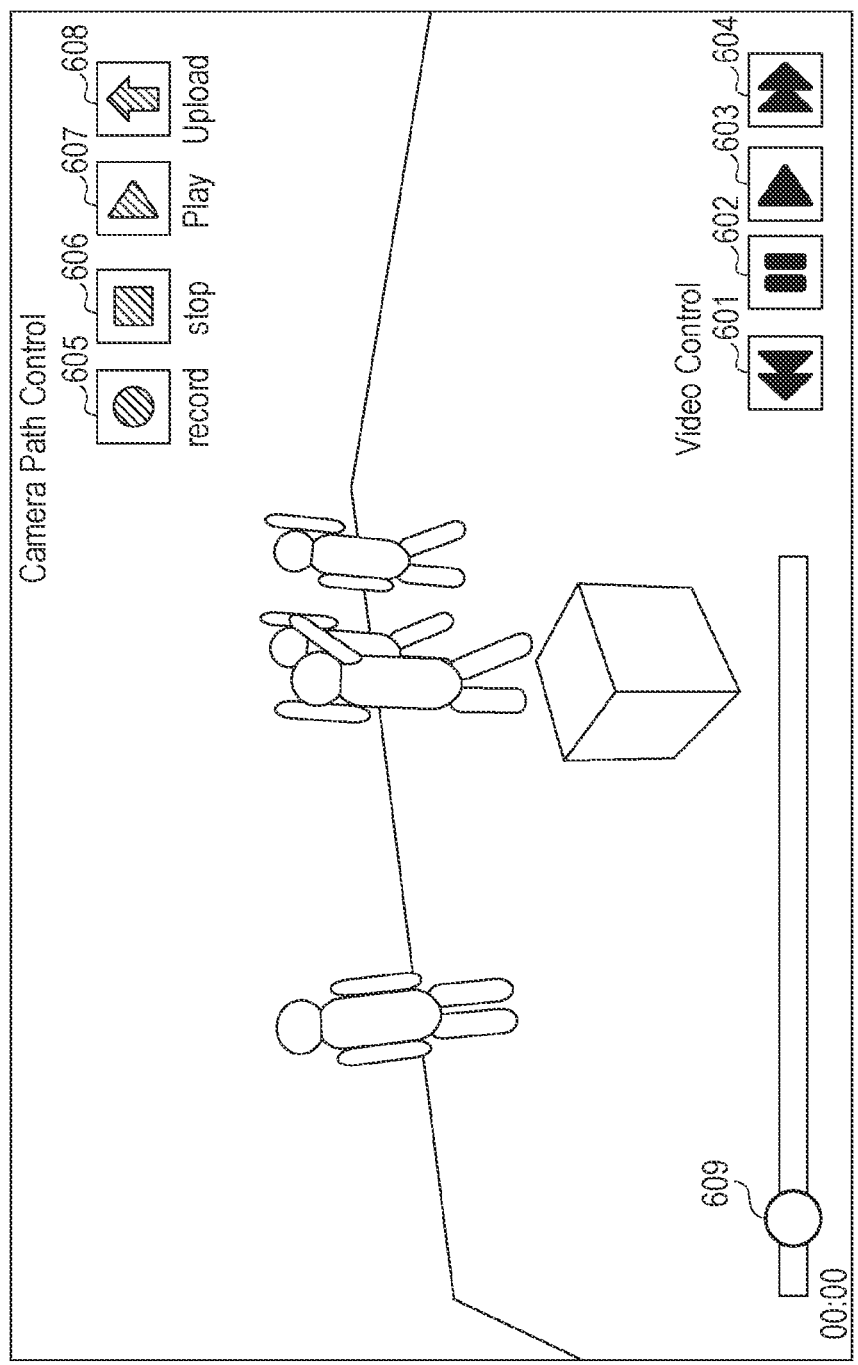
FIG. 6 illustrates an example of an operation screen according to the first embodiment.

At S301, the operation unit 201 receives operation data in response to a user operation. An example of an operation. screen is illustrated in FIG. 6. The flow proceeds to S302 (1) in the case where the operation unit 201 receives data related to operation of the position, posture, or angle of view of the virtual camera as the operation data, or (2) in the case where the operation unit 201 receives data related to image control as illustrated by image control buttons 601 to 604. The flow proceeds to S302 also in the case where no user operation is received.

The flow proceeds to S309 in the case where the operation unit 201 receives data related to the start of generation of a camera path as illustrated by a camera path record start button 605 as the operation data at S301. The flow proceeds to S310 in the case where the operation unit 201 receives data related to the end of generation of the camera path as illustrated by a camera path record stop button 606 as the operation data. The flow proceeds to S311 in the case where the operation data into the operation unit 201 is data related to uploading of the camera path (provision of the camera path information) as illustrated by a camera path uploading button 608. The flow proceeds to S313 in the case where the operation unit 201 receives data related to selection of the camera path information as illustrated by a camera path play button 607 as the operation data.

According to the present embodiment, the camera path information corresponds to a set of parameters for reproducing specific camerawork and includes information about the position and posture of the virtual viewpoint at every predetermined time. An example of the camera path information is illustrated in FIG. 4. As illustrated in FIG. 4, the camera path information includes a key frame number, a moving image ID, a camera path time, a moving image time, and camera parameters.

The key frame number corresponds to information that represents the chronological order of key frames on the camera path. The key frames may be images (frames) that are included in a moving image content (for example, a video of a soccer game) or may be images (frames), for example, per second.

The moving image ID corresponds to identification information for identifying the moving image content. The camera path time corresponds to information that represents a time from the start of the camera path to each key frame. The moving image time corresponds to information that represents a time from the start of the moving image content that is represented by each key frame. The camera parameters correspond to information that represents the position, posture, and angle of view of the virtual camera. That is, the camera path information in FIG. 4 represents changes with time in the position and posture of the virtual camera during periods from the start of the moving image content that is identified by the moving image ID=3 until 0.016 seconds to 0.065 seconds have passed.

According to the present embodiment, the camera parameters can be classified into an external parameter and an internal parameter of the virtual camera. The external parameter of the virtual camera represents the position and posture of the virtual camera. The internal parameter of the virtual camera represents an optical characteristic of the virtual camera. The external parameter according to the present embodiment expresses the three-dimensional position (X, Y, Z) of the virtual camera and the posture (yaw, pitch, roll) of the virtual camera. The internal parameter expresses the angle θ of view. Expression methods with the camera parameters are not limited thereto. For example, the external parameter of the virtual camera may be represented by a matrix. The external parameter and the internal parameter are not limited to the above description. For example, the internal parameter of the virtual camera may contain information that represents the focal length, optical axis position, or distortion of the virtual camera, a standard focal length, zoom magnification, the degree of a blur or the number of output pixels depending on a focus position or distance for adjusting the depth of field, or an aspect. Differences in the aspect ratio and the number of the pixels between a terminal that generates the camera path information and a terminal that uses the camera path information can be canceled by using the angle of view and aspect information, or the angle of view in the vertical direction and the angle of view in the horizontal direction as the camera parameters. In an example in FIG. 4, the position, the posture, and the angle of view are included in the camera parameters, but the whole of the information is not necessarily essential. For example, if it is known in advance that the angle of view is fixed, the information about the angle of view may not be included in the camera path information.

Key frame management information that is held by a camera path manager 205 is used for generating the camera path information. An example of the key frame management information is illustrated in FIG. 5. The key frame management information includes information about the image or the camera parameters of the virtual camera when the information-processing apparatus 100 plays back the virtual viewpoint image. More specifically, the key frame management information includes the key frame number, the moving image ID, a key frame time, the moving image time, and the camera parameters. The key frame number, the moving image ID, the moving image time, and the camera parameters are described as for the camera path information. The key frame time corresponds to information that represents a time when a key frame is saved in response to a user operation. The camera path manager 205 of the information-processing apparatus 100 identifies the key frame number related to the camera path information from the key frame management information, corrects the key frame number, and generates the camera path information. The camera path manager 205 changes the key frame time in FIG. 5 into the camera path time when the camera path information is generated.

At S302, a time control unit 202 acquires the moving image time, based on the user operation that is acquired from the operation unit 201 and outputs the result thereof to a virtual-viewpoint-image-data-acquiring unit 203 and/or the camera path manager 205. The moving image time corresponds to information that represents an elapsed time when the start time of the moving image content (for example, a video of a sports game) is 0 seconds. For example, in the case where the user specifies a position (a position when 5 minutes and 15 seconds have passed since the start of the moving image content) on a seek bar 609 illustrated in FIG. 6, the time control unit 202 outputs the moving image time (5 minutes and 15 seconds) to the virtual-viewpoint-image-data-acquiring unit 203 and/or the camera path manager 205.

The time control unit 202, however, is not limited to the seek bar 609 and can output the moving image time in response to a user operation into an image playback button 603, an image pause button 602, an image reverse button 601, or a fast-forward button 604 in FIG. 6. Also, in the case where there is no user operation, the moving image time is continuously acquired and outputted.

Unless the virtual viewpoint image based on the camera path information that is set in advance by the information-processing apparatus 100 is being played back, the time control unit 202 sets the elapsed time when the start time of the moving image content is 0 seconds to the moving image time and outputs the elapsed time to the virtual-viewpoint-image-data-acquiring 203.

If the virtual viewpoint image based on the camera path information that is set in advance by the information-processing apparatus 100 is being played back, the time control unit 202 acquires the moving image time from the camera path information, based on the frame that is being payed back at the time of S302. The time control unit 202 outputs the moving image time to the virtual-viewpoint-image-data-acquiring unit 203 and the camera path manager 205. The time control unit 202 may identify two key frames before and after the camera path time of the frame that is being played back at the time of S302 and may acquire the moving image time by linear interpolation of the moving image times of the two key frames. The linear interpolation enables the difference between the frame rate of the terminal that generates the camera path information and the frame rate of the terminal that uses the camera path information be canceled. However, when it is known in advance that the frame rates of the terminal for generation and the terminal for use are equal to each other, it is not necessary to perform the linear interpolation.

When the camera path time of the frame that is being played back at the time of S302 reaches the camera path time of the last. key frame in the camera path information, the playback of the virtual viewpoint image based on the camera path information is stopped. The time control unit 202 outputs the moving image time related to the frame that is played back at the time of S302 to the virtual-viewpoint-image-data-acquiring unit 203.

At S303, a virtual camera control unit 204 acquires the user operation from the operation unit 201 and outputs the camera parameters (such as the position and posture of the virtual camera) that are used for rendering to the camera path manager 205 and/or a drawing unit 207. While the virtual viewpoint image based on the camera path information is played back, the virtual camera control unit 204 acquires the current camera parameters in the camera path information from the camera path manager 205 and outputs the camera parameters to the drawing unit 207. Specifically, while the virtual viewpoint image based on the camera path information is played back, the virtual camera control unit 204 acquires the camera parameters of a frame to be subsequently played back from the camera path information and outputs the camera parameters to the drawing unit 207. Since the camera path information is data for every key frame, a key frame that has a camera path time close to the camera path time of the frame to be subsequently played back is identified, and an interpolation process is performed on the camera parameters of the key frame to calculate the camera parameters. An interpolation method may be any method such as linear interpolation of the camera parameters of two frames in the vicinity or Bezier space interpolation. While the virtual viewpoint image based on the camera path information is not played back, the virtual camera control unit 204 receives a user operation related to, for example, the position and posture of the virtual viewpoint by using the operation unit 201. The virtual camera control unit 204 generates the camera parameters that represent the position, posture, and angle of view of the virtual camera in response to the user operation and outputs the camera parameters to the camera path manager 205 and the drawing unit 207.

For example, the virtual camera control unit 204 generates the external parameter of the virtual camera that causes the posture of the virtual camera to rotate in the right-hand direction when the user moves the mouse in the right-hand direction. For example, the virtual camera control unit 204 generates the external parameter of the virtual camera that causes the posture of the virtual camera to rotate in the upward direction when the user moves the mouse in the upward direction. The virtual camera control unit 204 generates the external parameter of the virtual camera that causes the position of the virtual camera to move forward and backward when the user moves a mouse wheel forward and backward. Even while the virtual viewpoint image based on the camera path information is played back, one or more parameters of the camera parameters that are derived from the user operation may be reflected.

At S304, the camera path manager 205 acquires the camera parameters of the virtual camera from the virtual camera control unit 204 and acquires the moving image time from the time control unit 202. The camera path manager 205 associates the moving image ID, the moving image time, the camera parameters of the virtual camera, and the key frame time (the current time) during playback with the key frame number and adds these to the key frame management At S305, the virtual-viewpoint-image-data-acquiring unit 203 acquires the material data (such as polygon data and texture data that are needed to generate the virtual viewpoint image) that is needed to generate the virtual viewpoint image from the HDD 105 or a data control device 113 and outputs the material data to the drawing unit 206. In the case where the material data is acquired from the data control device 113, the virtual-viewpoint-image-data-acquiring unit 203 acquires the material data from a virtual-viewpoint-image-data-holding unit 211 via a communication unit 208 and a communication unit 209.

At S306, the drawing unit 206 generates the virtual viewpoint image, based on the material data that is acquired from the virtual-viewpoint-image-data-acquiring unit 203 and the camera parameters that are outputted from the virtual camera control unit 204. The generated virtual viewpoint image is outputted to the display unit 207. Regarding rendering, a known technique can be used, and the detail thereof is not described herein. At S307, the display unit 207 displays the virtual viewpoint image that is acquired from the drawing unit 206.

At S308, whether the playback of the virtual viewpoint image ends is determined. If it is determined that the playback of the virtual viewpoint image continues, the flow returns to S301. If it is determined that the playback of the virtual viewpoint image ends, the processing in FIG. 3 ends. The determination at S308 is typically based on the user operation that is inputted in the operation unit 201.

At S309, the camera path manager 205 starts generating the camera path information. That is, the camera path manager 205 starts generating the camera path information in response to a predetermined user operation. The camera path manager 205 according to the present embodiment outputs the key frame number S of a key frame that is located at the beginning of the camera path information to the RAM 102 or the HDD 105. The key frame number S corresponds to the key frame number that is saved in the key frame management information at S304.

At S310, the camera path manager 205 generates and outputs the camera path information to the RAM 102 and/or the HDD 105. The camera path manager 205 generates the camera path information from information about key frames Ki (i=s, . . . , e) from a key frame Ks related to the key frame number S to a key frame Ke that is located at the end of the camera path information. The key frame Ke corresponds to the key frame that is lastly saved in the key frame management information, and e represents the key frame number of the last key frame. FIG. 4 illustrates an example of the camera path information including information about a key frame number of 1 to 4 in the key frame management information in FIG. 5 as information about a key frame number of 0 to 3.

Information about key frames K'j (j=0, . . . , e−s) in the camera path information is derived based on the respective key frames. The key frame number of each key frame K'j is designated by j, and the information about each key frame K'j is generated based on the key frame Ks+j. As for the camera path time of K'j, an elapsed time from the key frame time of the first key frame Ks of the camera path until the key frame time of the key frame Ks+j, the moving image ID, and the movingimage time are set as they are. As for the camera parameters of K'j, the camera parameters of the key frame Ks+j are set as they are. The camera path information is added to the generated camera path list. The information-processing apparatus 100 according to the present embodiment thus generates the camera path information by using the saved key frames and can consequently decrease the amount of required data more than the case where an image that has a required range is cut from a viewed image. However, the camera path information can be generated without using the key frame management information.

At S311, the camera path manager 205 outputs the generated camera path list to the display unit 207, and the display unit 207 displays the generated camera path list. The camera path manager 205 acquires a user operation for selecting the camera path information to be uploaded from the operation unit 201 and outputs the selected camera path information to the communication unit 208. The user selects one or more pieces of the camera path information from the layed generated camera path list by using, for example, a touch operation. Uploading the camera path information instead of the image data as described above enables the virtual viewpoint image to be shared with a small amount of data communication. However, part of the image data (for example, a thumbnail of a representative image) may be uploaded together with the camera path information.

At S312, the communication unit 208 provides the data control device 113 (another apparatus) with the camera path information that is selected by the user. The communication unit 209 of the data control device 113 outputs the camera path information to a camera path manager 210 when the camera path information is acquired from the communication unit 208 (a path acquisition process). The camera path manager 210 acquires the camera path information from the communication unit 209 and adds the camera path information to a common camera path list. The common camera path list corresponds to the list of a collection of the camera path information that is provided by users. The user can download the camera path information in the common camera path list.

At S313, the camera path manager 205 acquires the common camera path list from the camera path manager 210 via the communication unit 208 and the communication unit 209. The camera path manager 205 outputs the camera path list that is generated at S310 and the common camera path list to the display unit 207. The display unit 207 displays the generated camera path list and the common camera path list that are acquired from the camera path manager 205.

At S314, the camera path manager 205 acquires the camera path information that is selected by using the operation unit 201 by the user, generates the camera path information based on the virtual viewpoint image (an image generation process), and p ays back the virtual viewpoint image. The user can select the camera path information by performing a mouse operation or a touch operation.

The information-processing apparatus 100 according to the present embodiment uploads (provides) and downloads (acquires) the camera path information that is generated by the user as described n detail above. The information-processing apparatus 100 generates and displays the camera path information based on the acquired virtual viewpoint image. With this structure, the user can share the camera path information with a simple operation. Since only the camera path information is shared instead of the virtual viewpoint image itself, users can efficiently share an image with a small amount of data communication. An image of camerawork that is set by oneself can be viewed by another person, and the desired camerawork can be selected from various kinds of shared camerawork.

Second Embodiment

As for a second embodiment, differences from the first embodiment will be mainly described. In an example described according to the first embodiment, the user selects the camera path information from the camera path list. According to the present embodiment, the data control device 113 recommends one or more camera paths among camera paths, and the user selects the desired camera path from the one or more recommended camera paths. The structure of the information-processing apparatus 100 according to the second embodiment is the same as that illustrated in FIG. 1 and FIG. 2, and reference characters in FIG. 1 and FIG. 2 are referred to describe the second embodiment.

According to the present embodiment, a method of determining the camera path to be recommended will be described in detail. In the case where a large number of camera paths are shared, it is difficult for the user to select the desired camera path therefrom. The data control device 113 according to the present embodiment recommends the camera path, based on the camera parameters of the virtual viewpoint image that is currently played back. The information-processing apparatus 100 may recommend the camera path.

Figure 7:
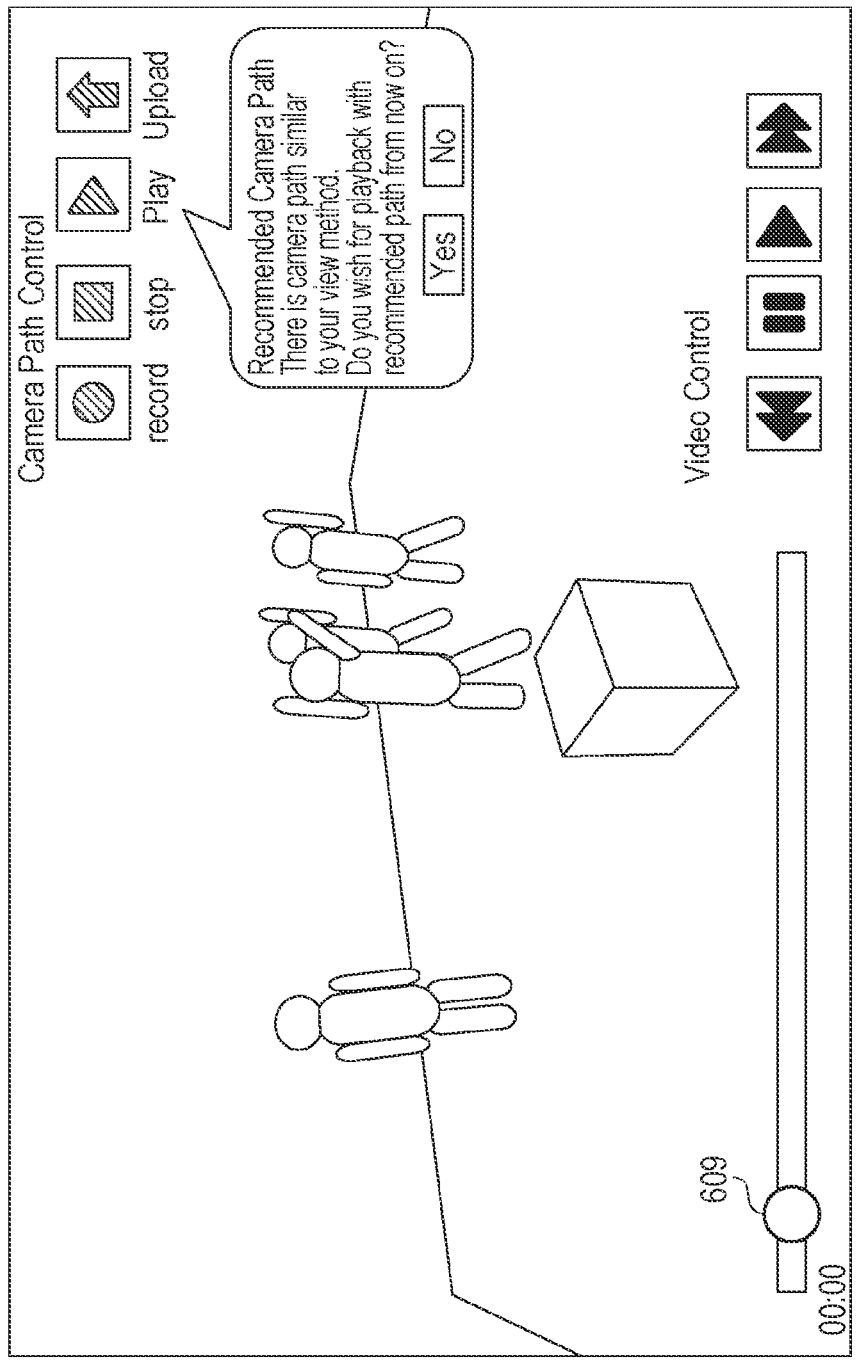
FIG. 7 illustrates an example of recommendation of a playback camera path according to a second embodiment.

FIG. 7 illustrates an example of recommendation of the camera path during the playback of the image. The camera path of camerawork similar to camerawork that is viewed by the user at that point is recommended, and this enables the user to continue viewing an image of the similar camerawork without any camera operation. The way of thinking in which camerawork similar to past camerawork is recommended is based on the presumption that camerawork that is preferred by the same user does not basically change greatly. In the case where an image of certain camerawork is halfway viewed, the presumption is such that there is a high possibility that the image is subsequently to be viewed with similar camerawork. For example, in the case where the user causes the virtual viewpoint image to be displayed with camerawork that enables a specific player to be well captured, the recommendation of a similar camera path enables the user to view the virtual viewpoint image in which the player is well captured, and no complicated operation is needed during the remaining time of the image.

However, a method of determining the camera path to be recommended is not limited to the method described above. For example, in the case where a specific event occurs in a game, the camera path for capturing the event from a viewpoint that differs from that for the camera path that is set by the user is recommended, and this enables replay images from various viewpoints to be readily played back. For example, in the case where the user plays back a goal scene from a high viewpoint in a soccer game, the data control device 113 recommends the camera path such that an image can be played back from the viewpoint of a player who shoots or the viewpoint of a goal keeper. This enables the user to readily view the goal scene, based on various kinds of camerawork.

In the case where the user directs the virtual camera in a different direction for viewing during the event and consequently misses the event, the data control device 113 recommends the camera path for viewing the scene that the user misses after the end of the playback or after the event. This enables the user to readily view the missed event. The data control device 113 may recommend the camera path that is selected by other many users. This enables the user to view an image that is often viewed by other people and makes it easy to share an image experience.

The flow of processing that is performed by the information-processing apparatus 100 according to the present embodiment will be described with reference to FIG. 2 and FIG. 8. FIG. 2 is the block diagram illustrating the functional configuration. of the information-processing apparatus 100 according to the present embodiment. The CPU 101 serves as the functional blocks illustrated in FIG. 2 by reading and running programs that are stored in the ROM 103 and/or the HDD104 with the RAM 102 used as the work area.

Figure 8:
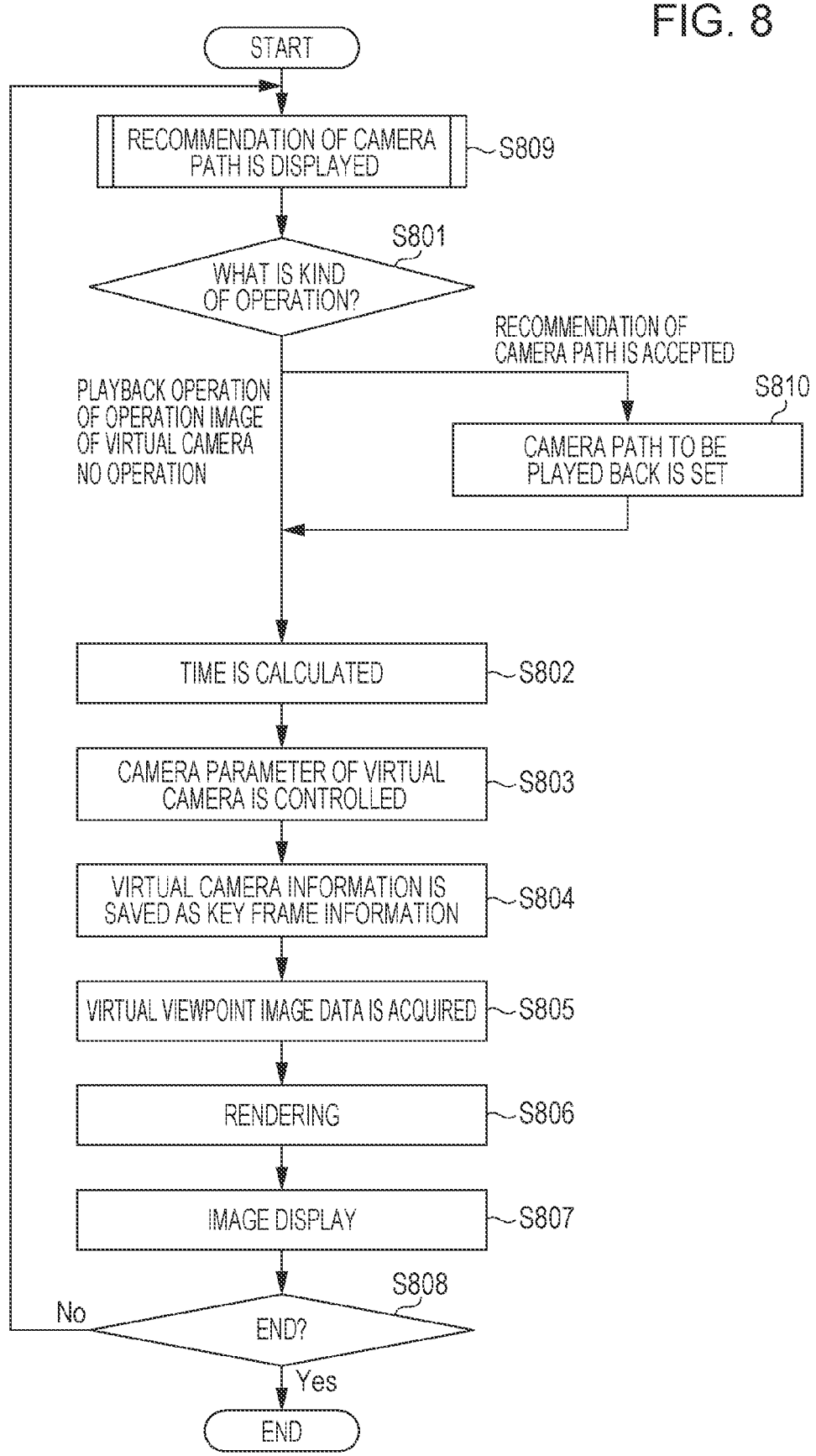
FIG. 8 is a flowchart illustrating the flow of processing of the information-processing apparatus 100 according to the second embodiment.

FIG. 8 is a flowchart illustrating the flow of operation of the information-processing apparatus 100 according to the present embodiment. Processes that will be described with reference to FIG. 8 are performed in a manner in which the CPU 101 of the information-processing apparatus 100 reads and runs programs that are stored in the ROM 103 and/or the HDD104 with the RAM 102 used as the work area. Processes at S801 to S808 are the same as those at S301 to S308 according to the first embodiment, and a description thereof is omitted. In the flowchart in FIG. 8, the processes at S309 to S314 in FIG. 3 are not illustrated. However, the same processes as those at S309 to S314 may be added.

At S809, the camera path manager 205 acquires a camera path recommendation list (a recommendation path list) from the camera path manager 210 via the communication unit 208 and the communication unit 209 and outputs the camera path recommendation list to the display unit 207. The display unit 207 displays the camera path recommendation list. A process of acquiring the camera path recommendation list and a process of calculation will be described in detail later.

At S810, the camera path manager 205 identifies the selected camera path from the camera path recommendation list, based on a user operation that is received by using the operation unit 201 and plays back the virtual viewpoint imacie based on the camera path. The user can select the camera path by performing a mouse operation or a touch operation.

<Acquisition of Camera Path Recommendation List (Recommendation Path List)>

Figure 9:
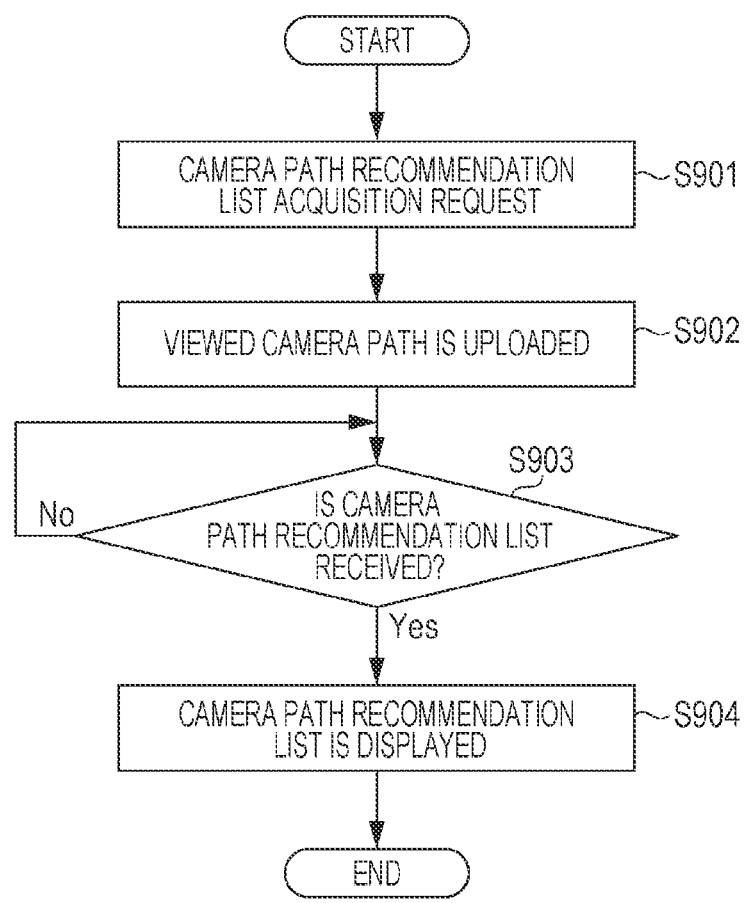
FIG. 9 is a flowchart illustrating the flow of camera path recommendation display processing of the information-processing apparatus 100 according to the second embodiment.

At S809 in FIG. 8, the acquisition of the camera path recommendation list starts. Processing of acquiring the camera path recommendation list will be described in detail with reference to a flowchart in FIG. 9. Processes that will be described with reference to FIG. 9 are performed in a manner in which the CPU 101 of the information-processing apparatus 100 reads and runs programs that are stored in the ROM 103 and/or the HDD104 with the RAM 102 used as the work area.

At S901, the camera path manager 205 outputs an acquisition request for the camera path recommendation list to the camera path manager 210 via the communication unit 208 and the communication unit 209. A current image playback state that is selected from pre-playback, intra-playback, post-event, and post-playback may be added to the acquisition request. The end of the event is determined by using event data. The event data includes an event start time and an event end time and is included in the virtual viewpoint image data that is acquired at S805.

At S902, the camera path manager 205 generates the camera path to be uploaded and outputs the camera path to the camera path manager 210 via the communication unit 208 and the communication unit 209. The length of information about the camera path to be uploaded changes depending on the playback state. When the playback state is the pre-playback, there is no key frame, and the camera path information is not generated. When the playback state is the intra-playback or the post-playback, the camera path information is generated from key frames during a period from the time of image playback to the present. When the playback state is the post-event, the camera path information is generated from key frames during a period from the event start time to the event end time.

At S903, the camera path manager 205 determines whether the camera path recommendation list has been acquired from the communication unit 208. If the camera path recommendation list has not been acquired, the flow proceeds S903. If the camera path recommendation list has been acquired, the flow proceeds to S904.

At S904, the camera path manager 205 outputs the camera path recommendation list to the display unit 207. The display unit 207 displays the camera path recommendation list.

<Generation of Camera Path Recommendation List>

Processing of generating the camera path recommendation list will be described in detail with reference to a flowchart in FIG. 10. Processes that will be described with reference to FIG. 10 are performed by the external server 111 of the data control device 113. The processing of generating the camera path recommendation list may be performed by the information-processing apparatus 100.

At S1001, the camera path manager 210 determines whether a camera path recommendation list acquisition request is acquired from the communication unit 209. If the camera path recommendation list acquisition request is not acquired, the flow proceeds to S1001. If the camera path recommendation list acquisition request is acquired, the flow proceeds to S1002.

At S1002, the camera path manager 210 selects the kind of the camera path to be recommended, based on information about the image playback state that is included in the camera path recommendation list acquisition request that is acquired from the communication unit 209. When the image playback state is the intra-playback, the camera path manager 210 selects a "similar camera path" of camerawork similar to that for the camera path uploaded by the user, which is an example of a selection method. When the image playback state is the post-event, the camera path manager 210 selects a "different viewpoint camera path" or a "missed event camera path", or both. The "different viewpoint camera path" corresponds to a camera path for capturing the object from a viewpoint that differs from that for the camera path uploaded by the user. The "missed event camera path" corresponds to a camera path for capturing the missed event in the case of the camera path uploaded by the user. When the image playback state is the post-playback, the "similar camera path", the "missed event camera path", the "different viewpoint camera path", or some or all of these are selected. When the image playback state is the intra-playback, a "popular camera path" is selected. The selection method is not limited thereto. The information-processing apparatus 100 may select the camera path.

At S1003, the camera path manager 205 determines whether the camera path information uploaded by the user has been acquired from the communication unit 209. If the camera path information has been acquired, or the image playback state is the pre-playback, the flow proceeds to S1004. If the camera path has not been acquired, the flow proceeds to S1003.

At S1004, the camera path manager 210 extracts the camera path to be recommended from the common camera path list, based on the camera path information that is acquired from the communication unit 209 and generates the camera path recommendation list. The kind of the camera path to be recommended includes those of one or more camera paths among the similar camera path, the different viewpoint camera path, the missed event camera path, and the popular camera path that are selected at S1002. The camera path to be recommended is a camera path that has a high reputation among the camera paths in the common camera path list. Camera paths that have a high reputation for every kind may be added to the camera path recommendation list. A method of deriving an evaluation value can be changed depending on the kind of the camera path to be recommended. The evaluation value may be derived by using only a camera path Cu that is uploaded by the user and N camera paths Csi (i=0, . . . , N−1) that have the same image ID as the camera. path Cu. The evaluation value for the camera paths can be the sum of weighted evaluation values that are calculated for the key frames. In the case where the number of the key frames, a sampling interval, or a camera path length differ between the camera paths Cu and Csi, the number of the key frames and the image time can be equalized by sampling the key frames from the camera paths Cu and Csi at a regular time interval, based on the image time. A method of comparing the camera paths described herein involves sampling the key frames at a regular interval and comparing the key frames. However, the evaluation value may be derived by using a method of comparing series data such as DP matching. The sum of the weighted evaluation values for the key frames is described as the evaluation value for the camera paths. However, the evaluation value may be derived by using an average value or a median value.

The similar camera path corresponds to a camera path most similar to the camera path Cu uploaded by the user among the camera paths Csi. Here, camera paths for capturing the same object in the same direction are similar to each other. The degree of similarity between the key frames can be derived by using the sum of the weighed inverse numbers of distances between the camera parameters (the position, the posture, and the angle of view) for the key frame of the camera path Cu and the key frames of the camera paths Csi. For example, as for the distances between the parameters, the L2 norms of differences between the parameters are used. The degree of similarity is not limited to the inverse numbers of the distances between the camera parameters. For example, in the case of the degree of coincidence of a group of the object ID of each object that is captured by the camera or a game in which a captured object plays on a ground, the degree of similarity may be derived by using the degree of coincidence of a captured range on the ground, or comparison between pixel values or characteristic values of an image that is captured by the virtual camera. As for the degree of coincidence of the group of the oblect ID, a Dice coefficient, a Jaccard coefficient, and a Simpson coefficient can be used.

The different viewpoint camera path corresponds to a camera path for capturing the same object as the camera path Cu uploaded by the user from a different viewpoint among the camera paths Csi. The evaluation value for the camera paths can be derived by using the degree of similarity of the object and the sum of weighted degrees of the differences between the camera parameters. The different viewpoint camera path corresponds to a camera path that has a high evaluation value against the camera path Cu. For the degree of similarity of the object, the degree of coincidence of a group of identification information (the object ID) about the object that is captured by the camera, for example, is used. The degrees of the differences between the camera parameters can be derived by using the sum of weighted distances between the parameters of the position, posture, and angle of view of the camera. For example, as for the distances between the parameters, the L2 norms of the differences between the parameters can be used.

The missed event camera path corresponds to a camera path for capturing the event in the case where views that are provided by using the camera paths Csi contain no region in which the event occurs. The evaluation value can be derived by using only a key frame in a period in which the event, which is not captured by using the camera path Cu uploaded by the user, occurs among the camera paths. That is, the weight of the evaluation value in a period in which the event does not occur is set to 0. The evaluation value can be the degree of coincidence between the group of the object ID in the region in which the event occurs and the group of the identification information (the object ID) about the object that is captured by the camera. In the case of a game in which the captured object plays on a ground, the degree of coincidence of a captured range on the ground may be used.

The popular path is irrelevant to the uploaded camera path and corresponds to a camera path that has a large number of playbacks among common paths. The evaluation value can be the number of playbacks of the camera paths Csi. At S1005, the camera path manager 210 outputs the camera path recommendation list to the communication unit 209.

The information-processing apparatus 100 and the data control device 113 according to the present embodiment recommend the camera path, based on the image playback state and the camera path that is currently viewed as described above. Recommendation of the camera path suitable for the view state of the user enables the user to view the image of the desired camerawork by using a simple operation.

Other Embodiments

Embodiments of the present invention are not limited to the embodiments described above, and various embodiments are acceptable. For example, according to the embodiments described above, the camera path is saved and uploaded after the end of generation of the camera path. However, uploading of the camera path may start at the start of generation, and uploading of the key frames may start when the key frames are saved. This enables the camera path to be uploaded in real time and enables the camerawork and the viewed image to be shared with another user in real time.

According to the embodiments described above, the camera path is generated by using an operation for the start of generation of the camera path and an operation for the end of generation of the camera path. However, a key frame start number and a key frame end number may be inputted with a freely determined timing to generate the camera path. This enables the camera path to be generated by cutting a scene in the image later. The key frame start numbers and the key frame end numbers may be inputted to generate the camera path by connecting image sections.

According to the embodiments described above, the camera path to be played back is recommended. Regarding uploading of the camera path, however, it may be recommended that the user upload the camera path after the event or after playback. For example, as for an image of a soccer, an "uploading" button is displayed together with a message "Do you upload the camera path for viewing this shoot scene?" after the end of the shoot scene. When the user performs an uploading operation, the camera path in the event period is generated and uploaded. The camera path that is to be uploaded because of the recommendation is generated from the key frame management information by using key frames ranging from the key frame at the event start to the key frame at the event end.

According to the embodiments described above, the camera path is generated from the single virtual viewpoint image and uploaded. However, the camera path may be generated from virtual viewpoint images. The camera path that enables an image that contains collected specific scenes such as a soccer goal collection to be viewed by generating the camera path from the virtual viewpoint images.

According to the embodiments described above, the single camera path is played back, and the virtual viewpoint image is displayed. However, camera paths may be selected, and the camera paths may be displayed on divided screens at the same time. At this time, to match the time of images to be displayed, the playback speed of another camera path may be adjusted or may be temporally set to zero so as to match the image time of a specific camera path such that the same scene can be viewed from different viewpoints at the same time.

According to the embodiments described above, the camera path information does not include information about the object. However, information about the transparency of the object during rendering, for example, may be included and reflected during playback. In some cases, an object that is not to be displayed is captured between the watched object and the virtual camera depending on the camera path, and the desired camerawork cannot not be generated. In these cases, the transparency of the object that is not to be displayed is increased, and this makes it easy to generate the desired camerawork, for example, which enables the watched object to be displayed.

According to the embodiments described above, each key frame is saved at a regular interval. However, the timing with which the key frame is saved may be changed by using a user operation. Consequently, to generate the camera path information, images are compared by using various camera parameters, and camera path information that includes only a favorite key frame can be generated.

According to the embodiments described above, the motion of the virtual camera that changes with time can be readily shared.

The present invention can also be carried out in a manner in which a system or the apparatus is provided with a program for performing one or more functions according to the above embodiments via a network or a storage medium, and one or more processors of a computer of the system or the apparatus read and run the program. The present invention can also be carried out by a circuit (for example, an ASIC) for performing one or more functions.

The present invention is not limited to the above embodiments. Various modifications and alterations can be made without departing from the spirit and scope of the present invention. Accordingly, the following claims are attached. to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. An information-processing apparatus comprising:
one or more memories that store a set of instructions;
one or more processors that are in communication with the one or more memories, the one or more processors executing the instructions to cause the information-processing apparatus to:
determine key frame management information of a moving image,
wherein the key frame management information includes a key frame number, a moving image identifier, a key frame time, a moving image time, and parameters including a position of virtual viewpoint and a view direction from the virtual viewpoint;
generate, based on the determined key frame management information, camera path information that represents changes in a position of a virtual viewpoint and a view direction from the virtual viewpoint representing a viewpoint of a virtual viewpoint image generated based on images captured by imaging apparatuses, wherein the camera path information indicates parameters of a position of a virtual viewpoint, a view direction from the virtual viewpoint, and a moving image time that correspond to each of multiple frames; and
provide another apparatus with the camera path information that is generated.

2. The information-processing apparatus according to claim 1, wherein the camera path information contains the position of the virtual viewpoint and the view direction from the virtual viewpoint at every predetermined time.

3. The information-processing apparatus according to claim 1, wherein generation of the camera path information is started in response to reception of a user operation related to start of generation of the camera path information.

4. The information-processing apparatus according to claim 1, further causing the information-processing apparatus to:
operate the position of the virtual viewpoint and the view direction from the virtual viewpoint,
wherein the camera path information is generated in response to an operation being performed during a period from reception of a user operation related to start of generation of the camera path information to reception of a user operation related to end of generation of the camera path information.

5. The information-processing apparatus according to claim 1, wherein the camera path information is provided to the other apparatus in response to reception of a user operation related to provision of the camera path information.

6. An information-processing apparatus comprising:
one or more memories that store a set of instructions;
one or more processors that are in communication with the one or more memories, the one or more processors executing the instructions to cause the information-processing apparatus to:
acquire, from another apparatus, camera path information that represents changes in a position of a virtual viewpoint and a view direction from the virtual viewpoint representing a viewpoint of a virtual viewpoint image generated based on images captured by imaging apparatuses;
specify a key frame of the acquired camera path information;
generate the virtual viewpoint image, based on the acquired camera path information and the specified key frame; and
display the generated virtual viewpoint image on a display screen.

7. The information-processing apparatus according to claim 6, wherein the camera path information includes the position of the virtual viewpoint and the view direction from the virtual viewpoint at every predetermined time.

8. The information-processing apparatus according to claim 6, further causing the information-processing apparatus to:
acquire material data that is used for generating the virtual viewpoint image,
wherein the virtual viewpoint image is generated based on the camera path information that is acquired by using the acquired material data.

9. The information-processing apparatus according to claim 8, wherein the material data includes three-dimensional shape data of an object and texture data of the object.

10. The information-processing apparatus according to claim 6, wherein the camera path information is acquired from the other apparatus in response to reception of a user operation related to acquisition of the camera path information.

11. A method of processing information comprising:
determining key frame management information of a moving image,
wherein the key frame management information includes a key frame number, a moving image identifier, a key frame time, a moving image time, and parameters including a position of virtual viewpoint and a view direction from the virtual viewpoint;
generating camera path information, based on the determined key frame management information, that represents changes in a position of a virtual viewpoint and a view direction from the virtual viewpoint representing a viewpoint of a virtual viewpoint image generated based on images captured by imaging apparatuses, wherein the camera path information indicates parameters of a position of a virtual viewpoint, a view direction from the virtual viewpoint, and a moving image time that correspond to each of multiple frames; and
providing another apparatus with the generated camera path information.

12. A method of processing information comprising:
acquiring, from another apparatus, camera path information that represents changes in a position of a virtual viewpoint and a view direction from the virtual viewpoint representing a viewpoint of a virtual viewpoint image generated based on images captured by imaging apparatuses;
determining key frame management information of the acquired camera path information,
wherein the key frame management information includes a key frame number, a moving image identifier, a key frame time, a moving image time, and parameters including a position of virtual viewpoint and a view direction from the virtual viewpoint;
generating the virtual viewpoint image, based on the acquired camera path information and the determined key frame management information; and
displaying the generated virtual viewpoint image on a display screen.

13. A non-transitory computer-readable storage medium storing a program for causing a computer to perform a control method that controls an information-processing apparatus, the control method comprising:
determining key frame management information of a moving image,
wherein the key frame management information includes a key frame number, a moving image identifier, a key frame time, a moving image time, and parameters including a position of virtual viewpoint and a view direction from the virtual viewpoint;
generating camera path information based on the determined key frame management information, that represents changes in a position of a virtual viewpoint and a view direction from the virtual viewpoint representing a viewpoint of a virtual viewpoint image generated based on images captured by imaging apparatuses, wherein the camera path information indicates parameters of a position of a virtual viewpoint, a view direction from the virtual viewpoint, and a moving image time that correspond to each of multiple frames; and
providing another apparatus with the generated camera path information.

14. A non-transitory computer-readable storage medium storing a program for causing a computer to perform a control method that controls an information-processing apparatus, the control method comprising:
acquiring, from another apparatus, camera path information that represents changes in a position of a virtual viewpoint and a view direction from the virtual viewpoint representing a viewpoint of a virtual viewpoint image generated based on images captured by imaging apparatuses;
determining key frame management information of the acquired camera path information,
wherein the key frame management information includes a key frame number, a moving image identifier, a key frame time, a moving image time, and parameters including a position of virtual viewpoint and a view direction from the virtual viewpoint;
generating the virtual viewpoint image, based on the acquired camera path information and the determined key frame management information; and
displaying the generated virtual viewpoint image on a display screen.

* * * * *